US005586279A

United States Patent [19]
Pardo et al.

[11] Patent Number: 5,586,279
[45] Date of Patent: Dec. 17, 1996

[54] DATA PROCESSING SYSTEM AND METHOD FOR TESTING A DATA PROCESSOR HAVING A CACHE MEMORY

[75] Inventors: Ilan Pardo, Jerusalem; Yair Libman, Ramat Gan, both of Israel

[73] Assignee: Motorola Inc., Schaumberg, Ill.

[21] Appl. No.: 187,885

[22] Filed: Jan. 28, 1994

[30] Foreign Application Priority Data

Feb. 3, 1993 [GB] United Kingdom ............... 9302118

[51] Int. Cl.⁶ ............................................. G06F 12/08
[52] U.S. Cl. ................. 395/403; 395/421.1; 395/421.03; 395/455
[58] Field of Search .................... 364/200 MS File, 364/900 MS File; 395/455, 403, 421.1, 421.03, 414, 183.01

[56] References Cited

U.S. PATENT DOCUMENTS

| 4,811,209 | 3/1989 | Rubinstein | 395/471 |
|---|---|---|---|
| 5,014,195 | 5/1991 | Farrell et al. | 395/455 |
| 5,113,506 | 5/1992 | Moussouris et al. | 395/403 |
| 5,210,843 | 5/1993 | Ayers | 395/455 |
| 5,287,481 | 2/1994 | Lin | 395/462 |
| 5,287,490 | 2/1994 | Sites | 395/500 |
| 5,301,296 | 4/1994 | Mohri et al. | 395/455 |
| 5,317,718 | 5/1994 | Jouppi | 395/464 |
| 5,367,660 | 11/1994 | Gat et al. | 395/403 |
| 5,386,547 | 1/1995 | Jouppi | 395/449 |
| 5,418,922 | 5/1995 | Liu | 395/403 |

FOREIGN PATENT DOCUMENTS 1584537  5/1978  United Kingdom ............ G06F 11/34

*Primary Examiner*—Matthew M. Kim
*Attorney, Agent, or Firm*—Chris Hersch

[57] ABSTRACT

A cached processor (2) comprises a cache memory (8') having mode switching means for selecting an address capture mode whereby information, such as data and/or instructions, can be captured and stored in all or part of a cache array (30) of the cache memory in real time. The captured information can at any time be transferred to, and used by, an external debug station, coupled to the cached processor, to observe the executed program flow.

13 Claims, 4 Drawing Sheets

DATA PROCESSING SYSTEM AND METHOD FOR TESTING A DATA PROCESSOR HAVING A CACHE MEMORY

This invention relates to cached processors and more particularly to cached processors that have means for recording program flow.

BACKGROUND OF THE INVENTION

A known method used to debug a processor utilises means for observing the program flow during operation of the processor. With systems having off-chip cache, program observability is relatively straight forward by using probes. However, observing the program flow of processors having cache integrated on-chip is much more problematical since most of the processing operations are performed internally within the chip.

Typically, processor based systems are debugged using an In- Circuit-Emulator (ICE) device. The ICE is connected to pins of the processor's Central Processing Unit (CPU) socket (and may replace the CPU itself) and under operator control, executes either the normal application program or special debug software programs. The ICE halts execution when specific events occur, or when manually requested by the operator, and provides the operator with internal processor status information (such as register states) or system status information (such as memory or input/output states).

In order to debug a processor system, the ICE device must operate with the same electrical parameters as the processor system. For example, the connection between the ICE and the processor pins must comply with the processor's operating frequency. As processors become more powerful, they operate at higher frequencies and have higher pin counts. Connection of the ICE cable to the processor increases the capacitance on the processor pins, with the result that it is more difficult to maintain the high operating frequencies At high operating frequencies (for example above 50 MHz), the ICE cannot capture data from the processor pins due to the large capacitance thereon.

Another disadvantage of ICE devices is the high expense involved in their implementation. The ICE comprises a significantly large amount of expensive hardware such as a CPU and surrounding buffers and trace buffers to which data is captured from the processor. In addition, a special interface, that is capable of transferring signals at such high frequencies, is normally required.

A further disadvantage of using ICE devices to test cached processors lies in the fact that ICE devices can generally only be used with through-hole packages, such as Pin Grid Array (PGA) Dual-in-line packages, since problems arise when trying to connect an ICE to a system designed with modern types of packages, such as Plastic Leadless Chip Carrier (PLCC) packages, Ceramic Quadrupole Flat Packages (CQFP), Plastic Quadrupole Flat Packages (PQFP) and Tape Automated Bonding (TAB) packages.

A cached processor can also be tested by coupling a test station to a dedicated port of the CPU via cables. However, this arrangement also suffers from problems at high frequencies: the cable must be as extremely short for high operating frequencies.

It is also known to use a dedicated FIFO register in the cached processor to record the last five executed instructions. Such a register is expensive to implement and its small size is limiting.

There is therefore a need for a cached processor having inexpensive means which allows the real time capture of data in the cached processor for debug purposes and which can be used at high frequencies and with any type of packages.

SUMMARY OF THE INVENTION

In accordance with the present invention there is provided a cache memory for a cached processor, the cached memory being arranged to record program flow of the cached processor, the cache memory comprising:

a cache array for storing information;

a tag array for storing tag addresses for the information stored in the cache array;

input means for receiving program addresses of information to be processed in the cache array by the program;

address generating means, such as a counter, for generating a sequence of addresses; and mode switching means for switching the cache memory between a normal mode of operation in which the cache array is accessed by the program using the program addresses and tag addresses and an address capture mode of operation in which, during running of the program, the program addresses are fetched and stored in at least part of the cache array according to the sequence of addresses.

The cache memory in accordance with the invention can therefore be placed in an address capture mode, in which all or part of it is used as a trace buffer to capture program addresses. Since the trace buffer is implemented on-chip, maximum operating frequency is achieved.

Preferably, the cache memory further comprises address buffer means coupled to the cache array and to the input means for holding the fetched program addresses before the fetched program addresses are stored in the at least part of the cache array.

In an alternative arrangement, the mode switching means, on switching to the address capture mode of operation, is arranged to inhibit all of the cache array so that the program addresses can be stored in all of the cache array according to the sequence of addresses.

The cache array preferably comprises a plurality of sub-arrays. On switching to the address capture mode of operation, the mode switching means inhibits a predetermined number of the plurality of cache sub-arrays so that the program addresses can be stored in the predetermined number of inhibited sub-arrays.

Preferably, the cache memory further comprises output means, for example comprising an OnCE port, coupled to the cache array. The output means is enabled when the mode switching means switches the cache memory to a test mode of operation, such that the program addresses stored in the at least part of the cache array are transferred to an external device coupled to the cached processor.

A method for recording program flow in a cached processor is also described.

BRIEF DESCRIPTION OF THE DRAWINGS

Two embodiments of the invention will now be described, by way of example only, with reference to the accompanying drawings in which.

DETAILED DESCRIPTION OF THE DRAWINGS

Figure 1:
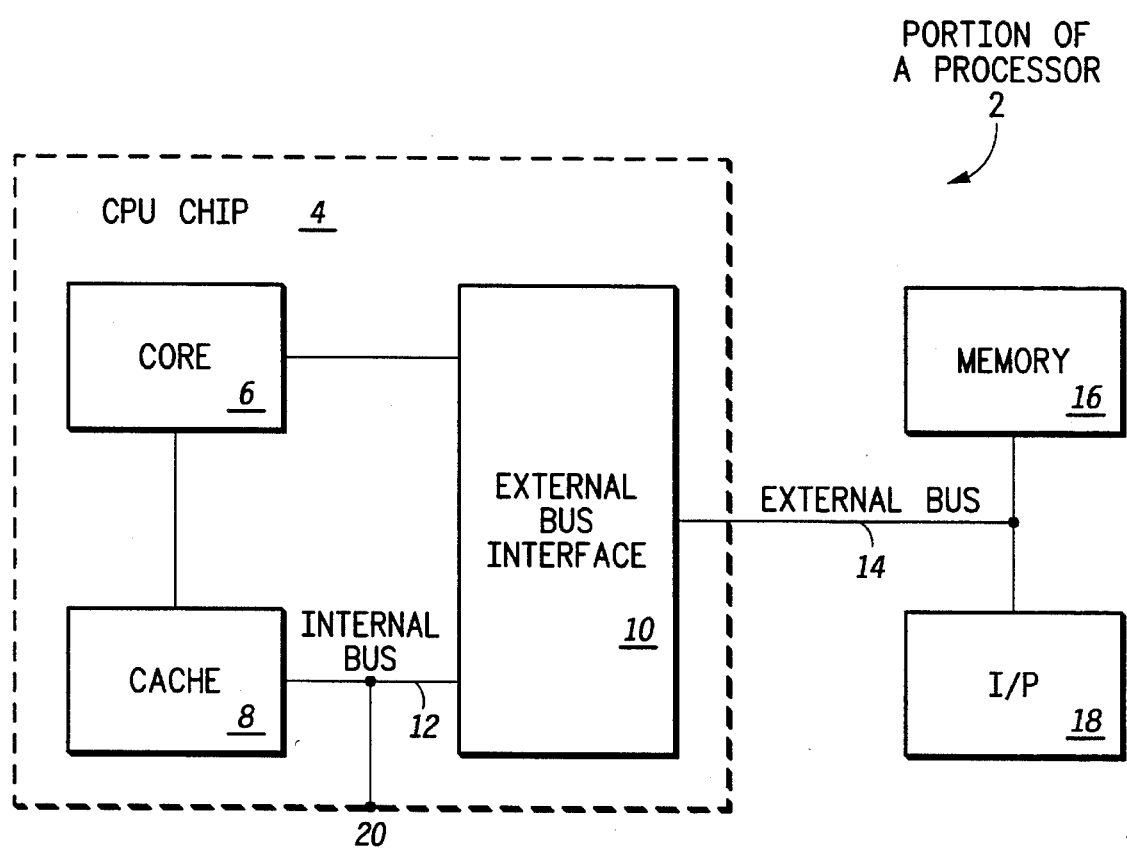
FIG. 1 is a simplified block schematic diagram of a cached processor the present invention.

Referring firstly to FIG. 1, part 2 of a processor in accordance with the present invention comprises a CPU chip 4 having a core 6, on-chip cache 8 and external bus interface 10 for communication with an external bus 14. The external bus 14 communicates with off-chip peripherals such as additional memory 16 and an input/output chip 18. The cache 8 and core 6 are coupled to the external bus interface 10 via an internal bus 12. A port 20 coupled to the internal bus 12 allows selective access to the cache 8.

Figure 2:
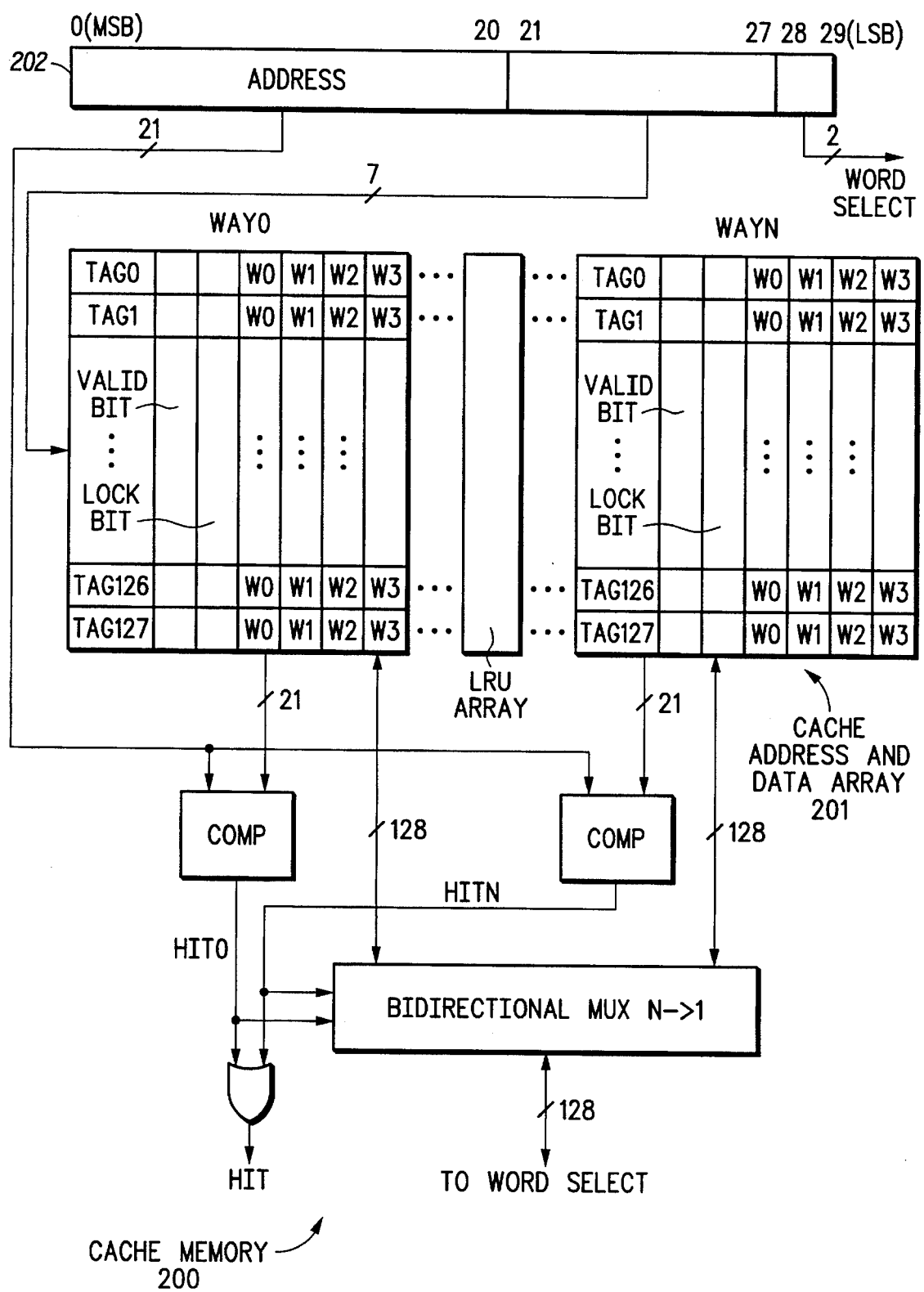
FIG. 2 is a simplified functional diagram of a set-associative cache memory.

Referring now to FIG. 2 which shows a simplified functional diagram of a typical set-associative cache memory 200.

The set-associative cache memory 200 comprises a cache address and data array 201 which is arranged to have N ways (way0-wayN), 128 sets (set0-set127) and a line length of four words (w0-w3), where each word is 32 bits in length. The term w0-w3 denotes word0-word3 in each line. The address 202 selects a way, a set and a line in the cache array 201.

Figure 3:
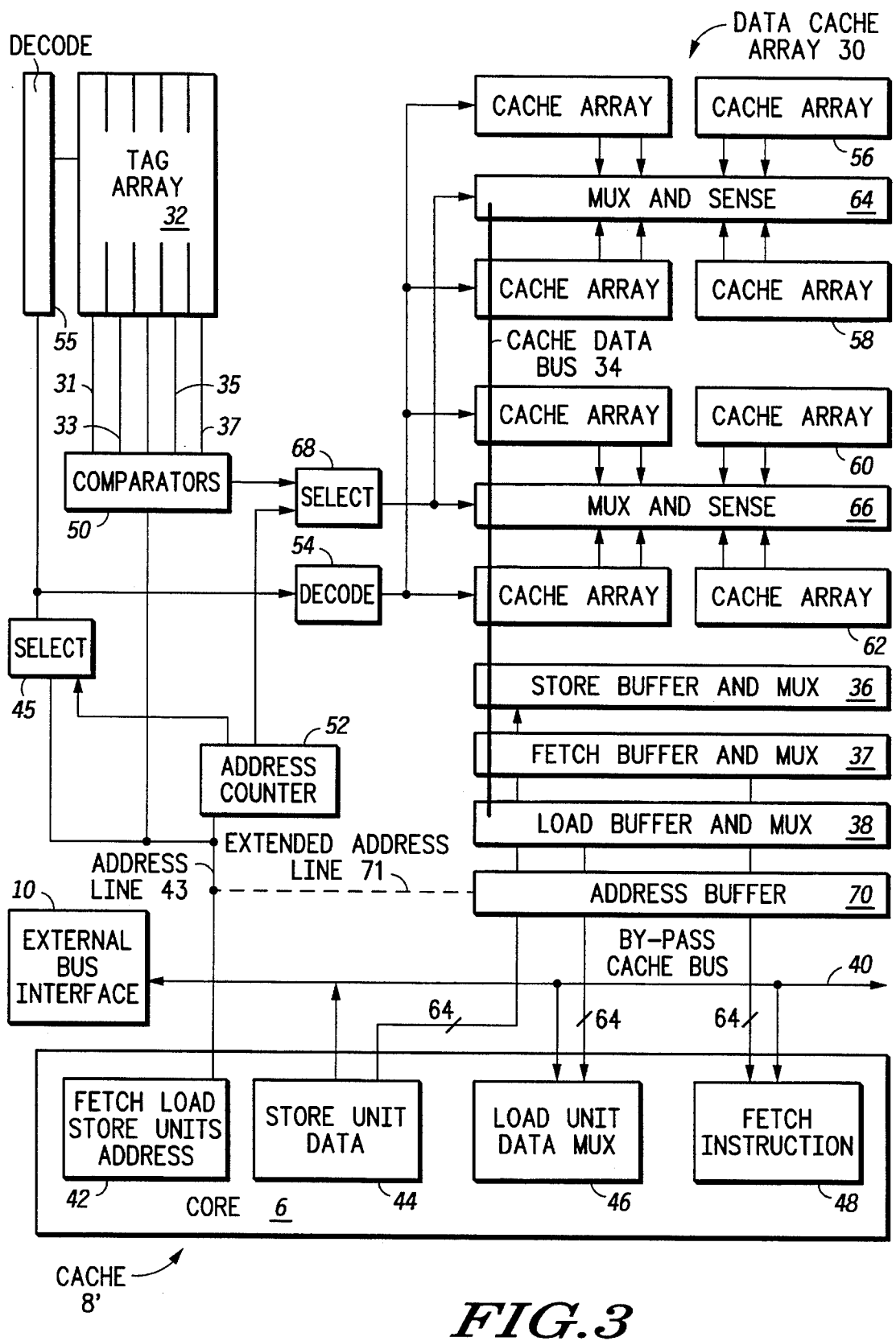
FIG. 3 is a simplified schematic diagram of a cache memory in accordance with first embodiment of the present invention for use in the processor of FIG. 1.

Referring now also to FIG. 3 which shows a first embodiment 8' of the cache of FIG. 1. The cache 8 comprises a data array 30 which holds information, such as instructions and/or data, a tag array 32 which contains the address of the data and/or instructions currently in the data array 30, and a cache data bus 34 which couples the data array 30 to store demultiplexer 36, fetch buffer 37 and lead buffer 38.

The data array 30 in accordance with the preferred embodiment comprises four sub-arrays 56, 58, 60, 62. The first 56 and second 58 sub-arrays are coupled to the cache data bus 34 via a first multiplexer and sense amplifier unit 64. The third 60 and fourth 62 sub-arrays are coupled to the cache data bus 34 via a second multiplexer and sense amplifier unit 66. The tag array 32 is therefore also subdivided into four blocks, each block being associated with one of the sub-arrays and having an address tag line 31, 33, 35 or 37.

A fetch load/store address unit 42, store data unit 44, lead data unit 46 and fetch instruction unit 48 are part of the CPU core 6 as shown by the dotted box. The store data unit 44, lead data unit 46 and fetch instruction unit 48 are coupled to by-pass cache bus 40 which is part of the internal bus 12 and so coupled to the external bus interface 10.

The arrangement of the cache 8' of FIG. 3 will now be described in more detail with reference to a read cache operation.

The cache 8' functions as a set-associative cache memory in which the cache array 30 is split into four sub-arrays 56–62 to shorten the access time and to save power consumption. In any given cycle, only one sub-array is selected, but all four ways of the selected sub-array are selected. The address of the data to be fetched is sent from the fetch load/store address unit 42 on an address line 43 to a comparator 50 and to decoders 54 and 55. Part of the address is decoded in decoders 54 and 55 to select one of the sub-arrays and its respective set of N ways.

In the tag array 32, there is a tag for each line in the cache. During every cycle, N tags, which correspond to the selected set of N ways, are read from the tag array 32. Thus, the decoded address selects a set of N tags in addition to the set of N ways.

In the preferred embodiment of FIG. 3, N=4 and the decoded address selects a set of N ways in one of the four sub-arrays 56–62 and the tag array 32.

In normal operation, the upper part of the address is sent directly to the decoders 54 and 55. In a 'flush-all' or 'data capture on' operation, the value of an address counter 52 is used as the address, instead of the address from the fetch load/store address unit 42. A select unit 45 selects between the counter value address and the address sent by the core 6.

Data is read in parallel from each of the four ways of the selected set of one of the sub-arrays to the respective multiplexer and sense amplifier unit 64 or 66 on four 128 bit lines. The addresses in the tag array 32 are read in parallel from the four tags of the selected set and compared by the comparator 50 with the part of the address that was not decoded in decoders 54 and 55. If a match occurs (i.e. a hit), the line containing the requested data from the appropriate way is selected and is loaded into the load buffer 38 from the cache data bus 34. The line of data is selected by selecting one of the four 128 bit lines, of the respective multiplexer and sense amplifier units 64 or 66, in response to the result generated by the comparator 50. The addressed word is sent to the load data unit 46.

If there is no match in the comparator 50 (i.e. a miss), the address is passed to the external bus interface 10 via a path which is not shown on FIG. 3. The addressed data is fetched from external memory 16 via the external bus interface 10 and by-pass cache bus 40.

The address counter 52 of the cache 8' is used for special cache control instructions, such as 'flush-all' cache instructions, in which data is written back to the main memory of the processor if a dirty line is detected.

The cache 8' in accordance with the invention further comprises an address buffer 70 coupled to the address line 43 by an extended address line 71. The address buffer 70 is also coupled to the data array 30 via the cache data bus 34. The address buffer 70 is utilised in a special address capture mode. The address capture mode can be selected in a number of different ways. For example, via a software command, a mode select signal on a hardware pin or an On-chip Circuit Emulation (OnCE) command.

On selecting the address capture mode, the address buffer 70 is enabled, the address counter 52 is reset and the cache 8' is disabled. The application programs are run from the system memory 16. In the address capture mode, each address from the fetch load/store address unit 42 is loaded into the address buffer 70 and stored in the data array 30 at an address generated sequentially by the address counter 52. The value of the counter 52 at reset corresponds to a start address of the cache data array 30.

Thus, during the address capture mode, the trace addresses of the instruction flow and/or data accesses of the executing program can be stored in the cache 8' at the processor's normal operating frequency. That is, in the address capture mode, the cache 8' is used as a trace buffer to record the executed program flow.

An operator can, at any time, down load the stored addresses to a debug station and the frequency of the down loading process is independent of the processor's operating frequency. For example, a simple, inexpensive debug station, such as a portable PC, can be coupled to the cache 8' via a slow port 20 of the processor and the captured data down-loaded. Since the data can be transferred at low frequencies, long cables can be used and so the prior art problems of coupling the debug station to the processor can be avoided.

Data is read out from the cache in special debug/test mode. During these modes, $\log_2 N$ (where N=4) bits more of the address (bits 20, 21) are used as a control of the first 64 and second 66 multiplexer and sense amplifier units.

It is not intended however that the invention be limited to down loading at a single port. Other means such as a plurality of pins could also be used. Alternatively, a OnCE serial debug port can be used to control and read the cache.

Figure 4:
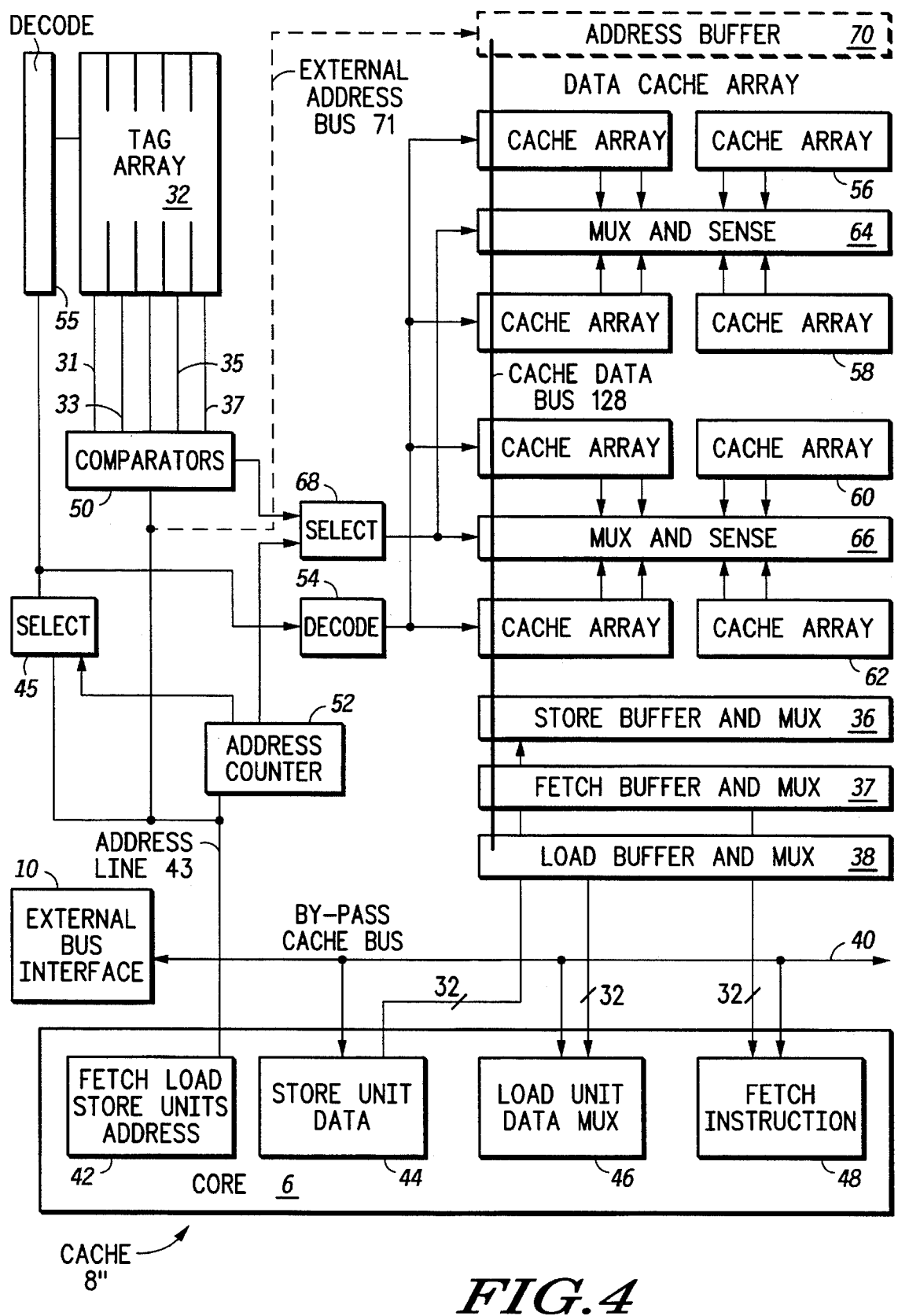
FIG. 4 is a simplified schematic diagram of a cache memory in accordance with a second embodiment of the present invention for use in the processor of FIG. 1.

In the embodiment shown in FIG. 3, during the address capture mode, the whole of the cache 8' is disabled. A second embodiment of the invention in which only part of the cache 8" is disabled on selecting the address capture mode, while the remaining portion of the cache operates as normal (illustrated in FIG.4) In FIG. 4 components similar to those in FIG. 3 are referred to by the same reference numerals. In this alternative arrangement, the extended address line 71 and address buffer 70 are re-arranged at the top of the data array 30 of FIG. 3, and the cache data bus 34 is divided in two such that the lower half of the array 30' is used for normal operation and the upper half 30" is used for address capture. An advantage of using only part of the cache 8" is that there is a only minimal effect on the normal operation of the processor.

Small logic is added to the select logic to eliminate the normal use of the ways which are assigned for the trace. The decoders 54 and 55 must be slightly modified so that one less bit is cared for (bit 21 is considered '0') and so all accesses are mapped to the bottom two sub-arrays 60 and 62. Similarly only half of the tag array 32 is used. In addition, one more bit per way must be saved in the tag array 32 so that it can be compared to bit 21 of the address, in order to validate a cache hit. This requires a small increase in the size of the tag array 32 and comparator 50. One way of avoiding enlarging the tag array 32 is to use the full tag array 32 but to invalidate the entries in the upper half of the tag array 32 when writing to the lower half and vice versa.

The preferred embodiments of the invention have been described with reference to an unified instruction and data cache. The invention may also be implemented in separate data caches and instruction caches. However, with an instruction cache an additional counter is required to generate the sequential addresses of the captured addresses.

Efficiency can be increased during the address capture mode by using a filtering technique whereby only specific information, such as instructions, flow-change instructions or data, is captured to the cache.

In summary, the cached processor in accordance with the present invention has means for selecting an address capture mode whereby data and/or instructions can be captured and stored in the cache in real time for use at any time by a debug station to observe the executed program flow.

Since the trace buffer is implemented on-chip, data is captured at the maximum operating frequency. Furthermore, due to the size of the cache, hundreds of instructions can be captured without the need for additional external logic.

The use of a single port, such as a OnCE port, to control and read the trace buffer ensures that the invention can provide debugging for any type of packaging: the cable connecting the debug station to the processor may be much longer than conventional ICE cables and no expensive connector is required for connecting to the CPU socket.

Furthermore, the present invention ensures that expensive interface devices are not required.

We claim:

1. A cache memory for a cached processor, the cached memory being arranged to record a program flow of the cached processor, the cache memory comprising:

a cache array for storing information;

a tag array for storing tag addresses for the information stored in the cache array;

input means for receiving program addresses of information to be processed in the cache array by the program;

address generating means for generating a sequence of addresses; and mode switching means for switching the cache memory between a normal mode of operation in which the cache array is accessed by the program using the program addresses and tag addresses and an address capture mode of operation in which, during execution of the program, the program addresses are fetched and stored in at least a part of the cache array according to the sequence of addresses.

2. The cache memory according to claim 1 wherein the address generating means comprises a counter for sequentially generating the sequence of addresses.

3. The cache memory according to claim 1 further comprising address buffer means coupled to the cache array and to the input means for holding the fetched program addresses before the fetched program addresses are stored in at least the part of the cache array.

4. The cache memory according to claim 1 wherein the mode switching means, on switching to the address capture mode of operation, inhibits the entire cache array so that the program addresses can be stored in the entire cache array according to the sequence of addresses.

5. The cache memory according to claim 1 wherein the mode switching means, on switching to the address capture mode of operation, enables the address buffer means and resets the counting means, such that a starting address of the sequence of addresses generated after reset by the counting means corresponds to a first storage location in the cache array for the first of the program addresses.

6. The cache memory according to claim 1 wherein the cache array comprises a plurality of sub-arrays, and the tag array comprises a plurality of tag sub-arrays, each of the plurality of cache sub-arrays having an associated tag sub-array, the mode switching means, on switching to the address capture mode of operation, being arranged to inhibit a predetermined number of the plurality of cache sub-arrays and the associated tag sub-arrays so that the program addresses can be stored in the predetermined number of inhibited sub-arrays.

7. The cache memory according to claim 1 further comprising output means coupled to the cache array, the output means being enabled when the mode switching means switches the cache memory to a test mode of operation such that the program addresses stored in the at least part of the cache array are transferred to an external device coupled to the cached processor.

8. The cache memory of claim 1 comprises a CPU integrated circuit having a processing core, a cache memory as claimed in any one of the preceding claims, a bus for inter-coupling the processing core and the cache memory, and an output port coupled to the bus for coupling the cached processor to an external device external to the cached processor during a test mode of operation.

9. A method for recording a program flow in a cached processor comprising a cache memory, the cache memory comprising a cache array for storing information and a tag array for storing tag addresses for the information stored in the cache array, the cache memory being switchable between a normal mode of operation in which the cache array is accessed by the program using program addresses and tag addresses and an address capture mode of operation in which during execution of the program flow, the program addresses are stored in at least apart of the cache array, the method comprising the steps of:

switching the cache memory from the normal mode of operation to the address capture mode of operation;

fetching the program addresses and sequentially holding fetched program addresses in an address buffer;

sequentially generating an address for each of the fetched program addresses held in the address buffer; and storing the fetched program addresses in at least part of the cache array according to sequentially generated addresses.

10. The method according to claim 9 wherein the step of switching comprises the steps of:

inhibiting the at least part of the cache array from the normal mode of operation; and enabling the address buffer.

11. The method according to claim 10 wherein the step of cache inhibiting inhibits the entire cache array during the normal mode of operation.

12. The method according to claim 9 wherein the step of switching comprises a step of generating a reset signal on switching the cache memory to the address capture mode of operation, and the step of generating sequential addresses comprises a step of generating a start address of the sequence of addresses in response to the reset signal, the start address corresponding to a first storage location in the cache array the a first one of the program addresses.

13. The method according to claim 9 further comprising the steps of:

switching the cache memory to a test mode of operation; and transferring the fetched program addresses stored in the at least part of the cache array into an external device coupled to the cached processor.

\* \* \* \* \*